United States Patent Office 3,527,453
Patented Sept. 8, 1970

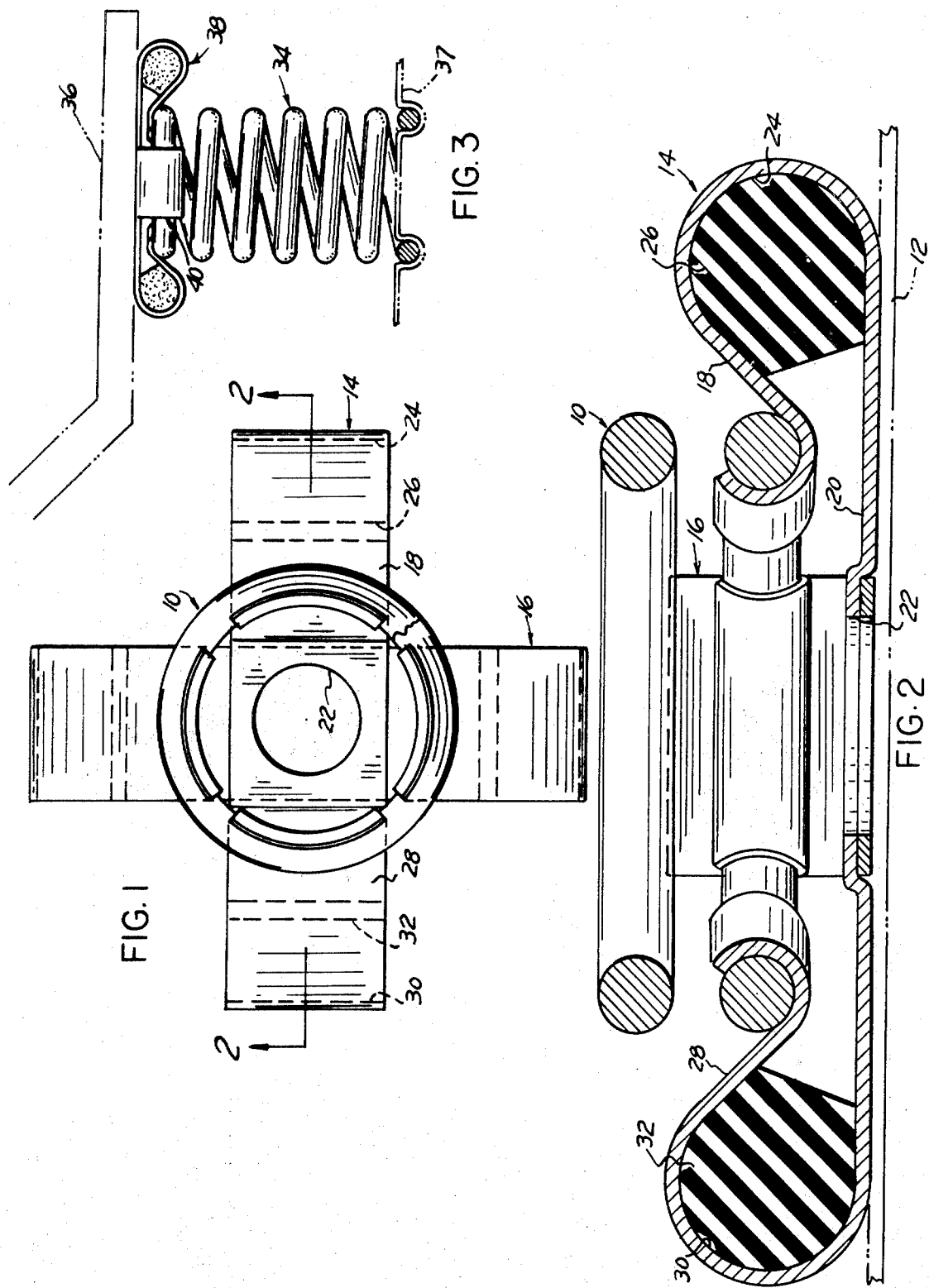

3,527,453
INERTIA-OFFSET VEHICLE RIDE DAMPER
Herbert C. Rice, 16940 Log Cabin,
Detroit, Mich. 48203
Filed Sept. 6, 1968, Ser. No. 757,820
Int. Cl. F16f 1/12
U.S. Cl. 267—140    4 Claims

ABSTRACT OF THE DISCLOSURE

An inertia-offset vehicle ride damper is disclosed constructed to be inserted between a given vehicle structure and a coil suspension spring to be mounted thereby and to absorb impact from road energy which would otherwise be transmitted to the vehicle chassis, said ride damper comprising a spring metal energy absorbing plate having a supported end and a free end, said free end constructed to hold a coil of said spring to have transmitted thereto offset in respect to said supported end the inertia of said spring, a spring metal supporting plate beneath and spaced from said energy absorbing plate, said supporting plate having attaching means by which said ride damper can be attached to said vehicle structure, and means at said supported end which include a reverse circular bend of metal integrally joining said energy absorbing plate and said supporting plate, and a solid rubber energy absorbing member captured in place in, and filling the space formed by said reverse bend, said rubber member in energy absorbing contact with said energy absorbing plate and said supporting plate, said free end being bent and curved so as to wrap about a run of an end coil of said spring, said free end disposed closer to said supporting plate than the height of said reverse bend.

---

My invention relates to vehicles.

The principal object of my invention is the provision of an inertia-offset vehicle ride damper constructed to be inserted between a given vehicle structure and a coil suspension spring to be mounted thereby and to absorb impact from road energy which would otherwise be transmitted to the vehicle.

The foregoing object of my invention and its advantages will become apparent during the course of the following description, taken in conjunction with the accompanying drawings, in which FIGS. 1 and 2 are, respectively, top plan and vertical sectional views of a set of inertia-offset vehicle ride dampers embodying my invention and shown in use beneath a coil suspension spring; and FIG. 3 is a side elevational view showing a set of inertia-offset vehicle ride dampers in use above a coil suspension spring.

Principle of operation—offset suspension provides leverage necessary for inertia of car weight Car weight is supported—in suspension—by the unit which employs yielding spring steel members, curved at outside end to accommodate molded sections of butyl type rubber.

These basic principles of unit operation combine to preclude side effects:

(1) Offset suspension is utilized by the unit—car weight is suspended in offset fashion at inside end of unit.

(2) Powerful leverage of car weight on curved outside end of unit is established by being carried in offset at inside end of unit.

Inertia of car weight is established by the leverage car weight has over action resulting from road shock impact. With leverage on support medium, car weight would, of course, create greater deflection of the spring steel and rubber in the curved, outside end of the unit than would be created by direct suspension of car weight.

Thus a depth of inert-type deflection is created with high concentration of inertia directly under car weight where leverage is greatest and where response to impact force from road shock would be the minimum. This greater deflection is a factor in retaining many of the desirable features of "soft" suspension but without "side-effects."

The net result is that impact force from road shocks can readily find responsive movement within the deflection range of the spring steel and rubber support media where the peak portions of impact energy is absorbed and dampened.

Car weight at inside end with its leverage advantage gained by being carried in offset suspension remains in a state of inertia, with fractional response to impact energy.

It is on this basic principle of car weights tendency to remain inert when the going is rough that the claim "no side effects" has legitimate foundation.

With a significant amount of road shocks being absorbed and dampened by the unit, jar, roughness and vibration will be noticeably reduced.

Riding comfort would also be significantly improved inasmuch as the prime factor in riding comfort is inertia type action of the car weight.

Mounting of unit

The unique design of the unit provides: (1) offset suspension of car weight and (2) mounting of the unit directly under car weight. The design of the unit and utilization of butyl type rubber accommodate arc travel of the free end of the unit during deflection cycle eliminating need for ball joint type or other special provisions for handling arc travel.

Economical to produce

Unit is formed from spring steel in the .125 thickness range—two units are required for 4 point suspension of car weight.

Butyl type rubber of desirable durometer is molded to fit curved section of spring steel members.

Durable—requires no service

Construction of the unit and type of materials used are such that no service is required and units should last the life of the vehicle.

The function of the chassis unit is to provide ways and means whereby side effects from the use of heavier tires and stronger chassis suspensions are significantly reduced.

Car manufacturers and safety authorities agree that heavier tires—whether they be radial, oval or more-ply—and "beefier" chassis suspension systems go to make for greater safety in the operation of the vehicles by the public.

These items are being made available as optional equipment by the car manufacturers and among the advantages gained by their use includes greater roadability and safety. More stability on curves and better cornering with less "tilt," better braking and less danger from tire failures.

The outstanding disadvantage or side effect resulting from the use of this heavier equipment is that the car and occupants are subjected to greater jar, harshness and vibrations than with the softer tires and chassis suspension—which absorb a greater amount of road shock energy before it reaches the car body and other suspended members. For example, on "washboard" or "corduroy" type roads the thinner and softer tires absorb a much higher percentage of road shock than the heavier tires.

The inertia-offset ride damper is engineered and designed to absorb and dampen this feed-in and feed-out of road shock energy and significantly lessen the jar and vibration which accompanies the use of heavier tires and chassis suspension.

Referring to the drawings in greater detail, the coil suspension spring shown in FIGS. 1 and 2 is designated 10 and the vehicle structure which mounts an end of said spring 10 is designated 12. The set of inertia-offset vehicle ride dampers shown in use between the bottom end of said spring 10 and said vehicle structure 12 are designated 14 and 16. The ride damper 14 comprises a spring metal energy absorbing plate 18 having a supported end and a free end. Said free end is constructed to hold a coil of said spring 10 to have transmitted thereto offset in respect to said supported end the inertia of said spring 10. Said free end is bent and curved so as to wrap about a run of an end coil of said spring 10. Said ride damper 14 also comprises a spring metal supporting plate 20 beneath and spaced from said energy absorbing plate 18. Said supporting plate 20 has a central aperture 22 which accommodates the conventional type shock absorber. Said ride damper 14 further comprises means at the supported end of said energy absorbing plate 18 which include a curved reverse bend 24 of metal integrally joining said energy absorbing plate 18 and said supporting plate 20. A rubber energy absorbing member 26 is captured in place in said reverse bend 24 in contact with said energy absorbing plate 18 and said supporting plate 20. The member 26 is molded of butyl rubber of the desired durometer and shape and may be bonded in place by well known methods. Said free end is disposed closer to said supporting plate 20 than the height of said reverse bend. Said ride damper 14 further comprises a second metal energy absorbing plate 28 constructed identically to the energy absorbing plate 18, the reverse bend of which is designated 30. The rubber energy absorbing member captured in place in the reverse bend 30 in contact with the energy absorbing plate 28 and said supporting plate 20 is designated 32. The ride dampers 14 and 16 are arranged at right angles to each other and hold the bottom end coil of the spring 10 at four opposite sides and on perpendicular diameters thereof. The ride dampers 14 and 16 are identical in construction except that the supporting plate of one is humped at the center thereof to accommodate cross-under of the other.

The coil suspension spring shown in FIG. 3 is designated 34 and the vehicle structure which mounts the top end of said spring 34 is designated 36. The vehicle structure which mounts the bottom end of said spring 34 is designated 37. The set of inertia-offset vehicle ride dampers shown in use between the top end of said spring 10 and said vehicle structure 36 are designated 38 and 40. The ride dampers 38 and 40 are arranged at right angles to each other and hold the top end coil of the spring 34 at four opposite sides and on perpendicular diameters thereof. The ride dampers 38 and 40 are constructed identically to the ride dampers 14 and 16 and have the same effect in reducing the transmission of road energy to the vehicle chassis.

It will thus be seen that there has been provided by my invention an inertia-offset vehicle ride damper in which the object hereinabove set forth together with many thoroughly practical advantages has been successfully achieved. While preferred embodiments of my invention have been shown and described it is to be understood that variations and changes may be resorted to without departing from the spirit of my invention as defined by the appended claims.

What is claimed is:

1. An inertia-offset vehicle ride damper constructed to be inserted between a given vehicle structure and a coil suspension spring to be mounted thereby and to absorb impact from road energy which would otherwise be transmitted to the vehicle chassis, said ride damper comprising a spring metal energy absorbing plate having a supported end and a free end, said free end constructed to hold a coil of said spring to have transmitted thereto offset in respect to said supported end the inertia of said spring, a spring metal supporting plate beneath and spaced from said energy absorbing plate, said supporting plate having attaching means by which said ride damper can be attached to said vehicle structure, and means at supported end which include a reverse circular bend of spring metal integrally joining said energy absorbing plate and said supporting plate, and a solid rubber energy absorbing member captured in place in and filling the space formed by said reverse bend, said rubber member in energy absorbing contact with both said energy absorbing plate and said supporting plate, said free end being bent and curved so as to wrap about a run of an end coil of said spring, said free end disposed closer to said supporting plate than the height of said reverse bend.

2. An inertia-offset vehicle ride damper as claimed in claim 1, a second energy absorbing plate having a supported end and a free end, said last-mentioned free end constructed to hold a coil of said spring to have transmitted thereto offset in respect to said last-mentioned supported end the inertia of said spring, means at said last-mentioned supported end which includes a second reverse circular bend of spring metal integrally joining said second energy absorbing plate and said supporting plate, and a second solid rubber energy absorbing member captured in place in and filling the space formed by said second reverse bend, said second rubber member in energy absorbing contact with both said second energy absorbing plate and said supporting plate, each said free end being bent and curved so as to wrap about a run of an end coil of said spring, each said free end disposed closer to said supporting plate than the height of the respective reverse bend, said two free ends arranged to hold the same spring coil at two opposite sides and on a diameter thereof.

3. A set of two inertia-offset vehicle ride dampers as claimed in claim 2 arranged at right angles to each other, said four free ends constructed to hold the same spring coil at four opposite sides and on perpendicular diameters thereof.

4. A vehicle chassis suspension mechanism comprising a coil suspension spring and a pair of inertia-offset vehicle ride dampers, said inertia-offset vehicle ride dampers arranged at right angles to each other and holding an end coil of said spring at four opposite sides and on perpendicular diameters thereof, each said ride damper comprising a pair of spring metal energy supporting plates and a spring metal absorbing plate, each said energy-absorbing plate having a supported end and a free end, each said free end constructed to hold said end coil to have transmitted thereto offset in respect to its respective supported end the inertia of said spring, and means at each supported end which includes a reverse circular bend of spring metal integrally joining said energy absorbing plate and said supporting plate, and a solid rubber energy absorbing member captured in place in and filling said reverse bend, said rubber member in energy absorbing contact with both said energy absorbing plate and said supporting plate, each said free end being bent and curved so as to wrap about a run of an end coil of said spring, each said free end disposed closer to its respective supporting plate than the height of the respective reverse bend.

References Cited

UNITED STATES PATENTS 2,619,946  12/1952  Michelich _____ 267—151
3,263,953  8/1966   Shottenfeld et al. ____ 267—152

JAMES B. MARBERT, Primary Examiner

U.S. Cl. X.R.

267—152

UNITED STATES PATENT OFFICE
CERTIFICATE OF CORRECTION

Patent No. 3,527,453                          September 8, 1970

Herbert C. Rice

It is certified that error appears in the above identified patent and that said Letters Patent are hereby corrected as shown below:

Column 4, line 47, "energy supporting plates" should read -- energy absorbing plates --; line 48, "spring metal absorbing plate" should read -- spring metal supporting plate --.

Signed and sealed this 23rd day of March 1971.

(SEAL)
Attest:

Edward M. Fletcher, Jr.                      WILLIAM E. SCHUYLER, JR.
Attesting Officer                                 Commissioner of Patents